US009112266B2

(12) United States Patent
Shewan et al.

(10) Patent No.: US 9,112,266 B2
(45) Date of Patent: Aug. 18, 2015

(54) MULTIBAND MONOPOLE ANTENNA BUILT INTO DECORATIVE TRIM OF A MOBILE DEVICE

(71) Applicant: Microsoft Corporation, Redmond, WA (US)

(72) Inventors: Benjamin Shewan, Redmond, WA (US); Javier Rodriguez De Luis, Redmond, WA (US); Alireza Mahanfar, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 13/707,441

(22) Filed: Dec. 6, 2012

(65) Prior Publication Data

US 2014/0162734 A1 Jun. 12, 2014

(51) Int. Cl.
*H04M 1/00* (2006.01)
*H01Q 1/24* (2006.01)
(Continued)

(52) U.S. Cl.
CPC ............. *H01Q 1/243* (2013.01); *H01Q 9/0421* (2013.01); *H01Q 9/42* (2013.01); *H01Q 21/28* (2013.01)

(58) Field of Classification Search
CPC ..... H01Q 1/38; H01Q 9/0407; H01Q 9/0421; H01Q 1/243; H01Q 5/00; H01Q 5/0034; H01Q 9/145; H01Q 9/30; H01Q 13/10; H01Q 13/085; H01Q 21/064; H01Q 21/24; H01Q 1/24; H01Q 1/44; H01Q 9/04; H04B 5/02; H04B 1/04; H04B 7/0617; H04B 7/0632; H04W 16/28; G06K 19/0723; G06K 7/0008; H04Q 1/246
USPC .......... 343/745, 722, 860, 700 MS, 702, 767, 343/770; 455/41.1, 129, 562.1, 475.7, 455/572–574, 550.1, 575.1
See application file for complete search history.

(56) References Cited

U.S. PATENT DOCUMENTS 6,140,966 A 10/2000 Pankinaho
7,050,004 B2 5/2006 Shafai et al.
(Continued)

FOREIGN PATENT DOCUMENTS

JP 10190345 7/1998
WO WO 2009/026304 2/2009
(Continued)

OTHER PUBLICATIONS

Behdad, et al., "Dual-Band Reconfigurable Antenna with a Very Wide Tunability Range", In *Proceedings of the IEEE transactions on Antennas and Propagation*, vol. 54, No. 2, Feb. 2006, 8 pages.
(Continued)

*Primary Examiner* — Brandon Miller
(74) *Attorney, Agent, or Firm* — Micky Minhas

(57) ABSTRACT

A multiband monopole antenna for a mobile device is disclosed that can be dynamically switched between a quarter-wave monopole antenna and a half-wave folded monopole antenna. In one embodiment, a radiator element can be built into at least part of a decorative trim on an outer casing of the mobile device. A circuit element embedded into the radiator element can electrically connect or disconnect a radiator element tip from a grounded portion of the decorative trim. In some embodiments, the circuit element can be a switch or a passive filter element, such as an inductor/capacitive-based filter. In other embodiments, the circuit element can be a tunable filter circuit whose impedance can be dynamically changed.

19 Claims, 6 Drawing Sheets

(51) Int. Cl.

| | |
|---|---|
| ***H01Q 9/04*** | (2006.01) |
| ***H01Q 9/42*** | (2006.01) |
| ***H01Q 21/28*** | (2006.01) |

(56) References Cited

U.S. PATENT DOCUMENTS

| | | | | |
|---|---|---|---|---|
| 7,330,152 | B2 | 2/2008 | Zhang et al. | |
| 7,564,411 | B2 | 7/2009 | Piisila et al. | |
| 8,248,312 | B2 | 8/2012 | Guan et al. | |
| 2005/0099347 | A1 | 5/2005 | Yamaki | |
| 2005/0243000 | A1 | 11/2005 | Hwang | |
| 2007/0146212 | A1 | 6/2007 | Ozden et al. | |
| 2010/0231461 | A1 | 9/2010 | Tran | |
| 2011/0133994 | A1 | 6/2011 | Korva | |
| 2011/0241949 | A1 | 10/2011 | Nickel et al. | |
| 2012/0001808 | A1* | 1/2012 | Nekozuka | 343/702 |
| 2012/0009983 | A1 | 1/2012 | Mow et al. | |
| 2012/0229347 | A1* | 9/2012 | Jin et al. | 343/702 |
| 2013/0157598 | A1* | 6/2013 | Rozenblit et al. | 455/127.2 |
| 2014/0038662 | A1* | 2/2014 | Alberth et al. | 455/550.1 |

FOREIGN PATENT DOCUMENTS

| | | | |
|---|---|---|---|
| WO | WO 2009/027579 | 3/2009 | |
| WO | WO 2009/027579 A1 * | 3/2009 | H01Q 1/24 |

OTHER PUBLICATIONS

Ebrahimi, Elham, "Wideband and Reconfigurable Antennas for Emerging Wireless Networks", In *a Thesis Submitted to the University of Birmingham for the Degree of Doctor of Philosophy* (*PhD*), Sep. 2011, 266 pages.

Liang, et al., "Multi-Band Frequency Reconfigurable Planar Inverted-F Antenna Designs", In *Proceedings of XXIX General Assembly of the International Union of Radio Scientifique Internationale*, Aug. 14, 2008, 4 pages.

Liu, et al., "Dual-Frequency Planar Inverted-F Antenna", In *Proceedings of the IEEE transactions on Antennas and Propagation*, vol. 45, No. 10, Oct. 1997, 8 pages.

Cetiner, et al., "Multifunctional Reconfigurable MEMS Integrated Antennas for Adaptive MIMO Systems", In *Proceedings of IEEE Communications Magazine*, Dec. 2004, 9 pages.

Huff, et al., "Integration of Packaged RF MEMS Switches With Radiation Pattern Reconfigurable Square Spiral Microstrip Antennas," In *Proceedings of IEEE Transactions on Antennas and Propagation*, vol. 54, Issue 2, Feb. 2006, 6 pages.

Kivekas, et al., "Frequency-Tunable Internal Antenna for Mobile Phones," In *Proceedings of 12$^{th}$ International Symposium on Antennas*, Nov. 14, 2002, 4 pages.

Komulainen, et al., "A Frequency Tuning Method for a Planar Inverted-F Antenna", In *Proceedings of IEEE Transactions on Antennas and Propagation*, vol. 56, Issue 4, Apr. 2008, 7 pages.

Mak, et al., "Reconfigurable Multiband Antenna Designs for Wireless Communication Devices," In *Proceedings of IEEE Transactions on Antennas and Propagation*, vol. 55, Issue 7, Jul. 2007, 10 pages.

Sheta, et al., "Compact Dual-band Tunable Microstrip Antenna for GSM/DCS-1800 Applications", In *Proceedings of IET Microwaves, Antennas & Propagation*, vol. 2, Issue 3, Oct. 9, 2006, 7 pages.

Wang, et al., "A Slot Antenna Module for Switchable Radiation Patterns," In *Proceedings of IEEE Antennas and Wireless Propagation Letters*, vol. 4, Jun. 2005, 3 pages.

Yang, et al., "Patch Antennas with Switchable Slots (PASS) in Wireless Communications:Concepts, Designs, and Applications", In *Proceedings of IEEE Antennas and Propagation Magazine*, vol. 47, Issue 2, Apr. 2005, 17 pages.

Yoon, et al., "Frequency Reconfigurable PIFA for Cell-Phone Application", Retrieved on: Nov. 14, 2012, Available at: http://ap-s.ei.tuat.ac.jp/isapx/2011/pdf/[FrP2-33]%20A15_1005.pdf.

International Search Report and Written Opinion from the European Patent office for corresponding Application No. PCT/US2013/073734, mailed Mar. 19, 2014, 11 pages).

International Search Report and Written Opinion from the European Patent office for corresponding Application No. PCT/US2013/073731, mailed Mar. 27, 2014 (9 pages).

* cited by examiner

MULTIBAND MONOPOLE ANTENNA BUILT INTO DECORATIVE TRIM OF A MOBILE DEVICE

BACKGROUND

In mobile devices, the number of supported frequency bands continues to increase with increasing demands for new features and higher data throughput. Some examples of new features include multiple voice/data communication links—GSM, CDMA, WCDMA, LTE, EVDO—each in multiple frequency bands, short range communication links (Bluetooth, UWB), broadcast media reception (MediaFLO, DVB-H), high speed internet access (UMB, HSPA, 802.11, EVDO), and position location technologies (GPS, Galileo). Supporting multiple frequency bands results in increased complexity and design challenges. Often, tradeoffs are made to support multiple frequency bands, at the cost of performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A multiband monopole antenna for a mobile device is disclosed that can be dynamically switched between a quarter-wave monopole antenna and a half-wave folded monopole antenna. In one embodiment, a radiator element can be built into at least part of a decorative trim on an outer casing of the mobile device. A circuit element embedded into the radiator element can electrically connect or disconnect the radiator tip from a grounded portion of the decorative trim.

In some embodiments, the circuit element can be a switch or a passive filter element, such as an inductor/capacitor-based filter. In other embodiments, the circuit element can be a tunable filter circuit whose impedance can be dynamically changed.

Using the embedded circuit element, the same radiator structure can be used for multiple antenna configurations, saving overall space for the mobile device.

The foregoing and other objects, features, and advantages of the invention will become more apparent from the following detailed description, which proceeds with reference to the accompanying figures.

DETAILED DESCRIPTION

In one embodiment, a radiator is formed using a conductive rim extending around an outer perimeter of a mobile device. The rim can be considered a decorative trim of the phone due to its visibility by a user. This rim can be partially connected to a printed circuit board (PCB) ground along the edges and disconnected from the PCB ground near antenna portions of the device. By electrically disconnecting a portion of the rim, the structure acts as a relatively low frequency planar inverted F antenna (PIFA) with a total length near one quarter of the resonant wavelength. When the rim is electrically connected, the structure acts as a relatively high frequency folded monopole antenna with a total length near one half of the resonant wavelength. The operation at low frequency bands (e.g. 700 MHz) can be accomplished with a broken rim.

The antenna can have multiple benefits: Antenna size reduction can be achieved given that the same resonator structure can act as radiating element for different frequencies; Antenna performance can improve due to the absence of tradeoffs between the multiple band (higher QoS, lower dropped calls, higher battery life); The antenna can be allocated in more "aggressive" volumes (e.g. closer to a PCB ground plane), which may have benefits from hand/head detuning effect and the regulated absorption of energy to the human tissue (specific absorption ratio, SAR).

Figure 1:
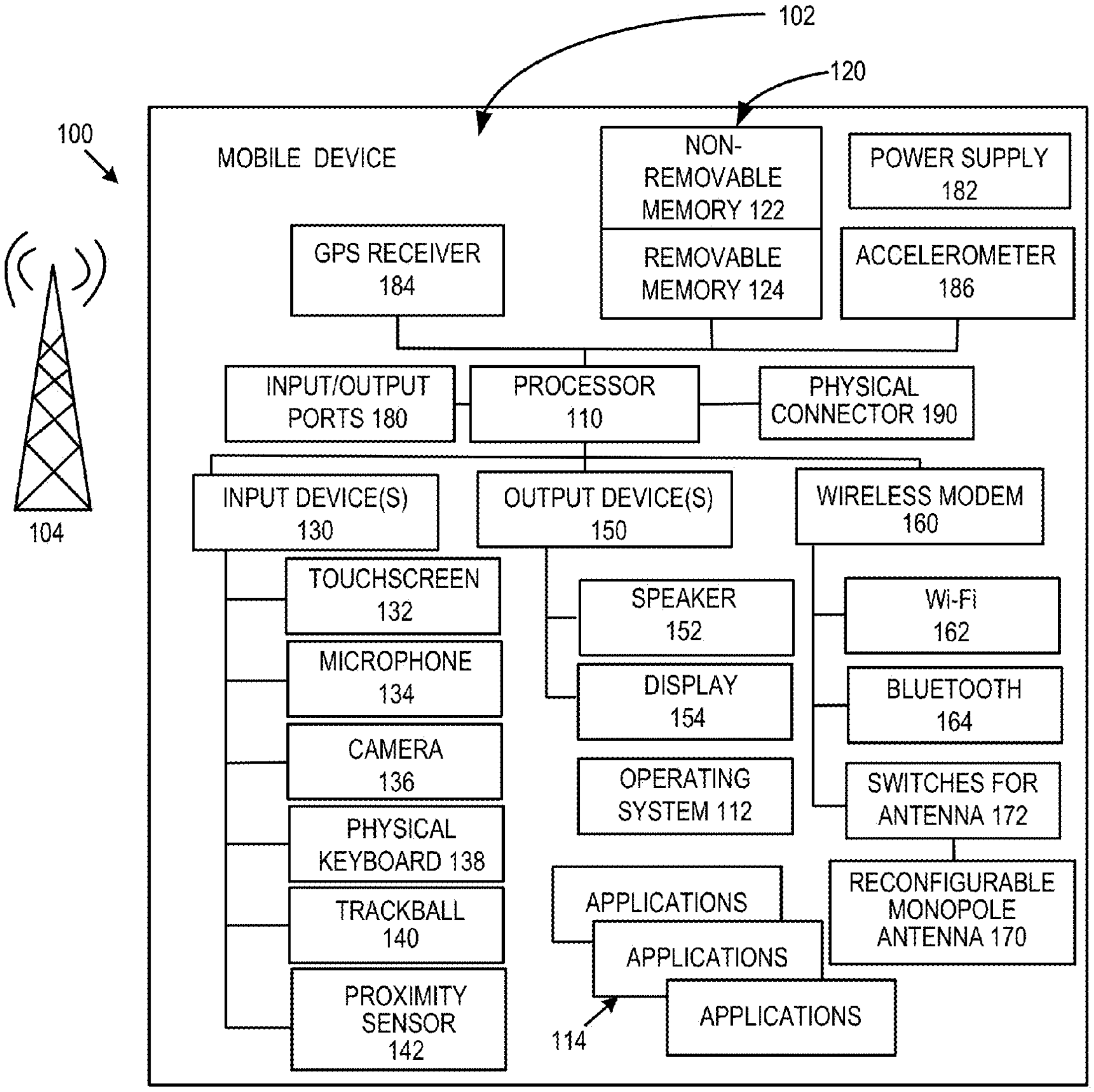
FIG. 1 is system diagram of a mobile device including a multiband monopole antenna.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), tablet, etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132, microphone 134, camera 136, physical keyboard 138, trackball 140, and/or a proximity sensor 142, and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device. The input devices 130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 112 or applications 114 can comprise speech-recognition software as part of a voice user interface that allows a user to operate the device 100 via voice commands. Further, the device 100 can comprise input devices and software that allows for user interaction via a user's spatial gestures, such as detecting and interpreting gestures to provide input to a gaming application.

A wireless modem 160 can be coupled to a reconfigurable monopole antenna 170 and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM network for data and voice communications within a single cellular network, between cellular networks, or between the mobile device and a public switched telephone network (PSTN). The one or more modems can communicate (transmit and receive) with the antenna 170 through one or more switches 172 that are used to configure the antenna for multiple frequency bands of operation, as further described below. The switches 172 can be controlled automatically by the modems based on an optimal frequency band to be used, or input can be received through one of the input devices 130 to select the desired frequency band. In alternative embodiments, the switches 172 need not be used. Instead the reconfigurable monopole antenna 170 can include a passive circuit element to reconfigure the antenna 170 based on frequency of the input signal. Still further, the antenna 170 can include tunable elements. For example, the proximity sensor 142 can be used to detect that a user's head is adjacent to the phone, which can introduce excess reactance. In response, the tunable elements can be tuned to ensure impedance matching is maintained. In any event, the antenna 170 can be selectably and programmatically configurable.

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can be deleted and other components can be added.

Figure 2:
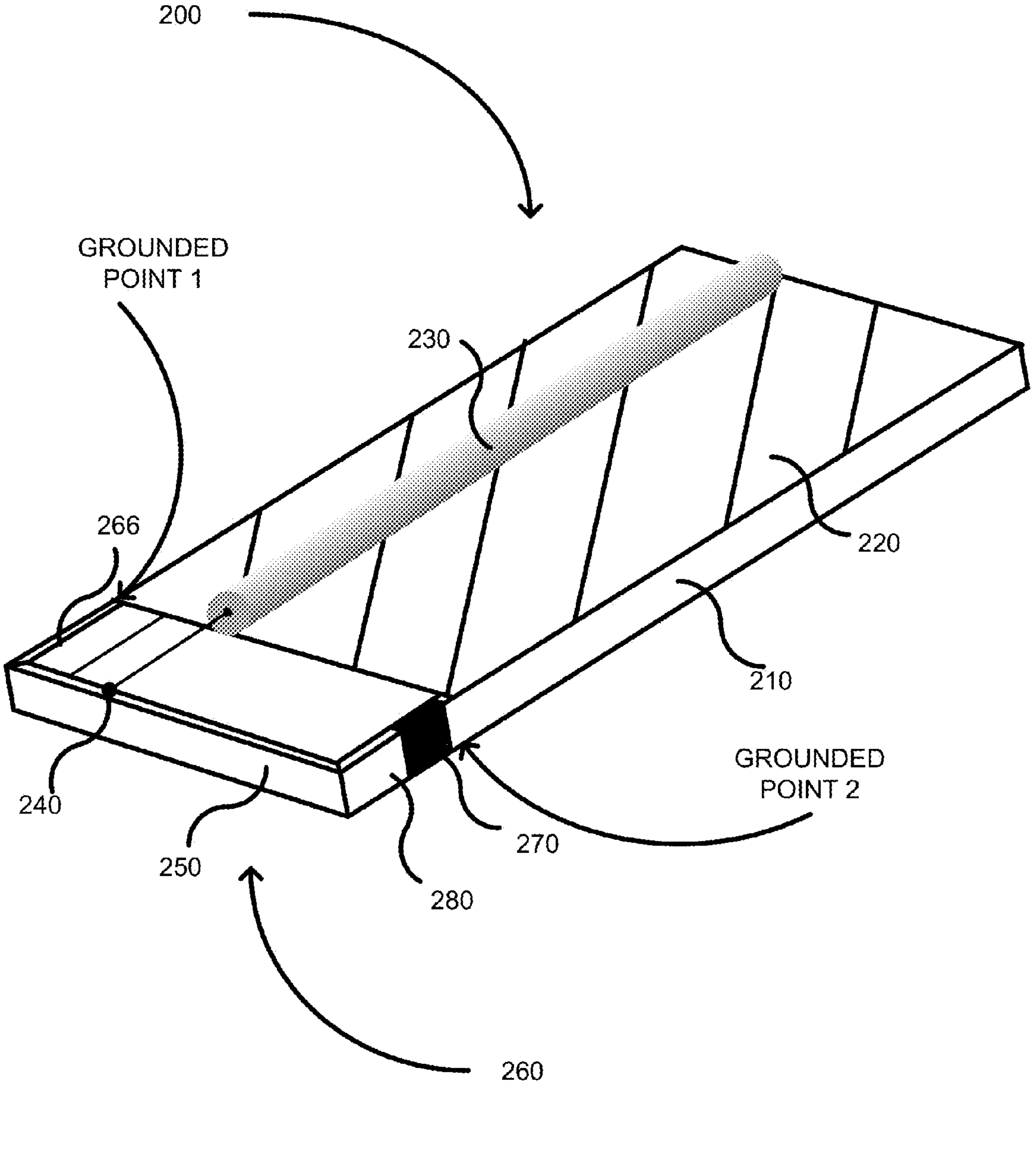
FIG. 2 is a three-dimensional view of a mobile phone with an outer casing removed to view hidden portions of the multiband monopole antenna.

FIG. 2 is a three-dimensional view showing an example mobile device 200 with a majority of an outer casing removed to expose inner components. However, a decorative trim 210, which is part of the outer casing, (as it is visible to the user with the outer casing in place) is shown extending around an outer perimeter of the mobile device. The decorative trim can be made from any of a variety of conductive materials, such as metals, and can function as the side walls of the mobile phone, in some embodiments. A ground plane 220 can be coupled to the decorative trim 210 and sized to be coextensive with a large portion of the outer perimeter. A cable 230 can extend over the ground plane 220 and connect at a feed point 240 to a radiator element 250 of an antenna, shown generally at 260. An impedance matching portion 266 of the decorative trim can be coupled at one end to the feed point 240 and, at the other end, to the ground plane 220 (indicated with an arrow at "grounded point 1"). The impedance matching portion 266 is used for impedance matching so that 50 Ohms, for example, can be maintained at the feed point 240. It will be recognized that the radiator element 250 and the impedance matching portion 266 can be monolithically formed as part of the decorative trim 210. A circuit element 270 can be embedded into the radiator element 250 adjacent a radiator tip 280 and between the radiator tip and a grounded portion of the decorative trim 210 (indicated with arrow at "grounded point 2"). Thus, the radiator element 250 can extend from the feed point 240 to the radiator tip 280. The circuit element 270 can effectively electrically connect or disconnect the radiator tip 280 of the antenna 260 to and from the grounded portion of the decorative trim. As is understood in the art, the circuit element can be an active or passive circuit element. For example, the circuit element 270 can be a switch (e.g., single pole, single throw or multi-pole, multi-throw) that opens or closes in response to a control signal (not shown). Alternatively, the circuit element can be a filter circuit (e.g., inductor and capacitor circuit) that blocks transmission at different frequencies. Whether active or passive case, the circuit element effectively electrically connects or disconnects the radiator tip from the grounded decorative trim.

It will be understood that the cable 230 is coupled to a modem (not shown) at an end opposite the feed point 240. The cable 230 can be replaced with a trace on a PCB to connect the modem to the feed point. Additionally, in some embodiments, such as the one shown in FIG. 2, the feed point 240 can be positioned on a side of the mobile phone 200 that is a different side than the circuit element 270. Positioning the feed point and the circuit element on different sides allows the radiator element to be long enough for most applications.

Thus, an antenna can include an embedded circuit element that utilizes the device structure to act as the radiator. The antenna 260 can generate a high (e.g., 2 GHz) and low frequency (e.g., 700 MHz) band behavior where both frequency bands are capable of being adjusted independently through the embedded circuit elements. Where the circuit element is a tunable element, it can be made of inductors and capacitors, which allows the antenna to behave as two electrically distinct topologies supported by the same physical structure. Alternatively, an RF switch can be used to open or close the loop, to support multiple frequencies. The resonant circuit is designed to act as a high impedance in the low frequency bands and to act as a low impedance in the higher frequency bands. In this way, a behavior can be achieved that combines that of the broken and unbroken topology. Such a circuit is consistent with the combined performance of the two physically different radiating structures.

Figure 3:
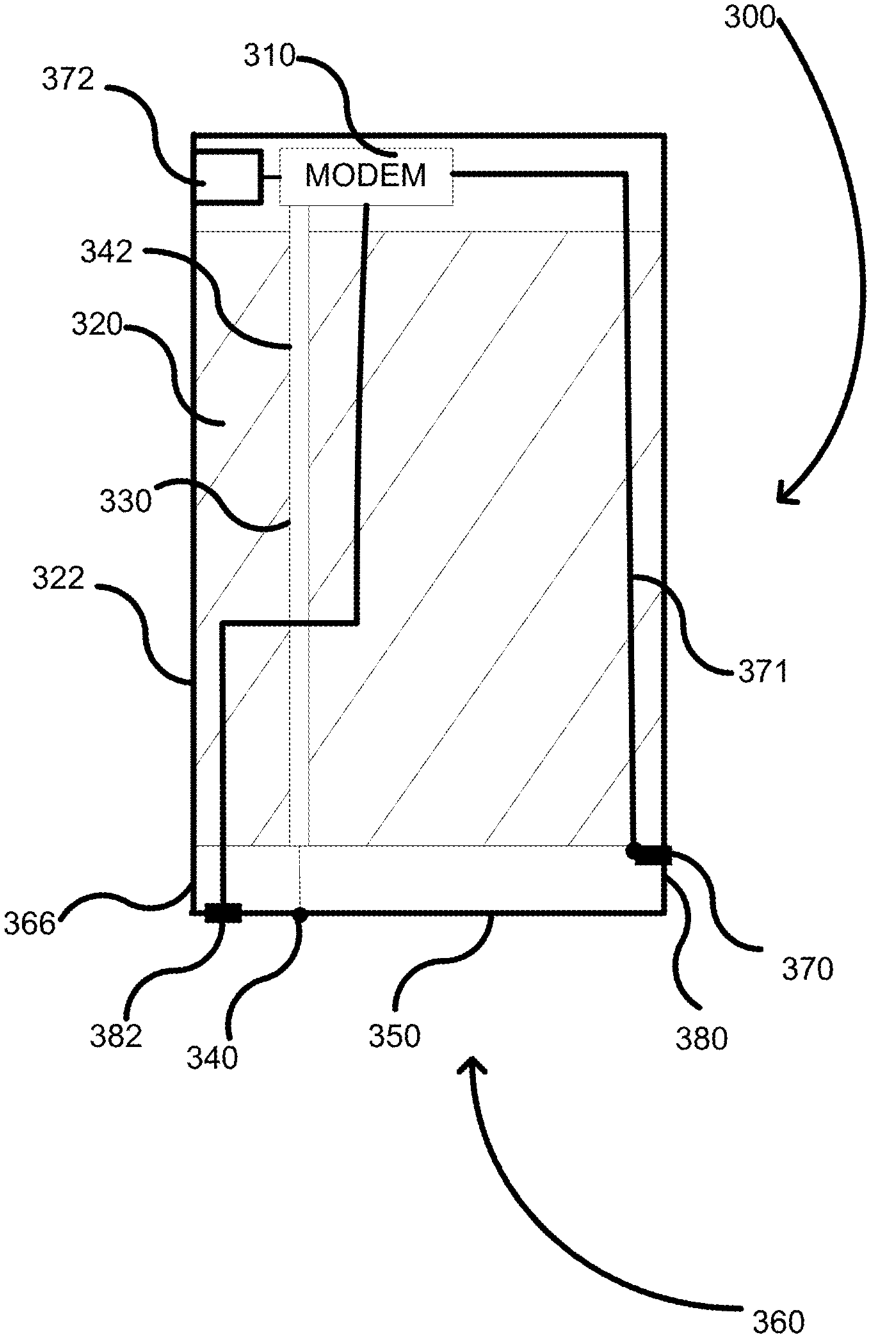
FIG. 3 is a top-down view of a mobile phone according to another embodiment including a multiband monopole antenna with dynamically configurable impedance matching.

FIG. 3 is a top view of a mobile device 300, according to another embodiment. In this embodiment, a modem 310 is shown coupled to a feed point 340 using a trace 342 (positioned on a PCB below the ground plane) and to a circuit element 370 using a PCB trace 371. A ground plane 320 can be used to ground a perimeter rim 322. An antenna 360 is formed using the rim 322, but at a location disconnected from the ground plane 320. Specifically, a radiator element 350 is formed from the rim 322, and includes a radiator tip 380. The radiator tip 380 is coupled to the circuit element 370. A proximity sensor 372 is shown that can detect a user's head adjacent to the mobile device 300. In response to such a detection, the proximity sensor 372 can send a signal to the modem 310, which can correspondingly control a circuit element 382 to adjust an impedance of the antenna 360. The circuit element 382 is shown along the impedance matching portion 366 of the decorative trim, but can be positioned at any desired location according to the specific design. The circuit element 370 can be a tunable element so that capacitive effects of a user's head can be compensated for by having the antenna's impedance dynamically matched. In still other embodiments, the impedance can be dynamically detected by an element at the feed point that measures an incident and reflected power in order to determine an impedance. In response, the modem 310 can tune one or more of the circuit elements in order to have a desired matching impedance.

Figure 4:
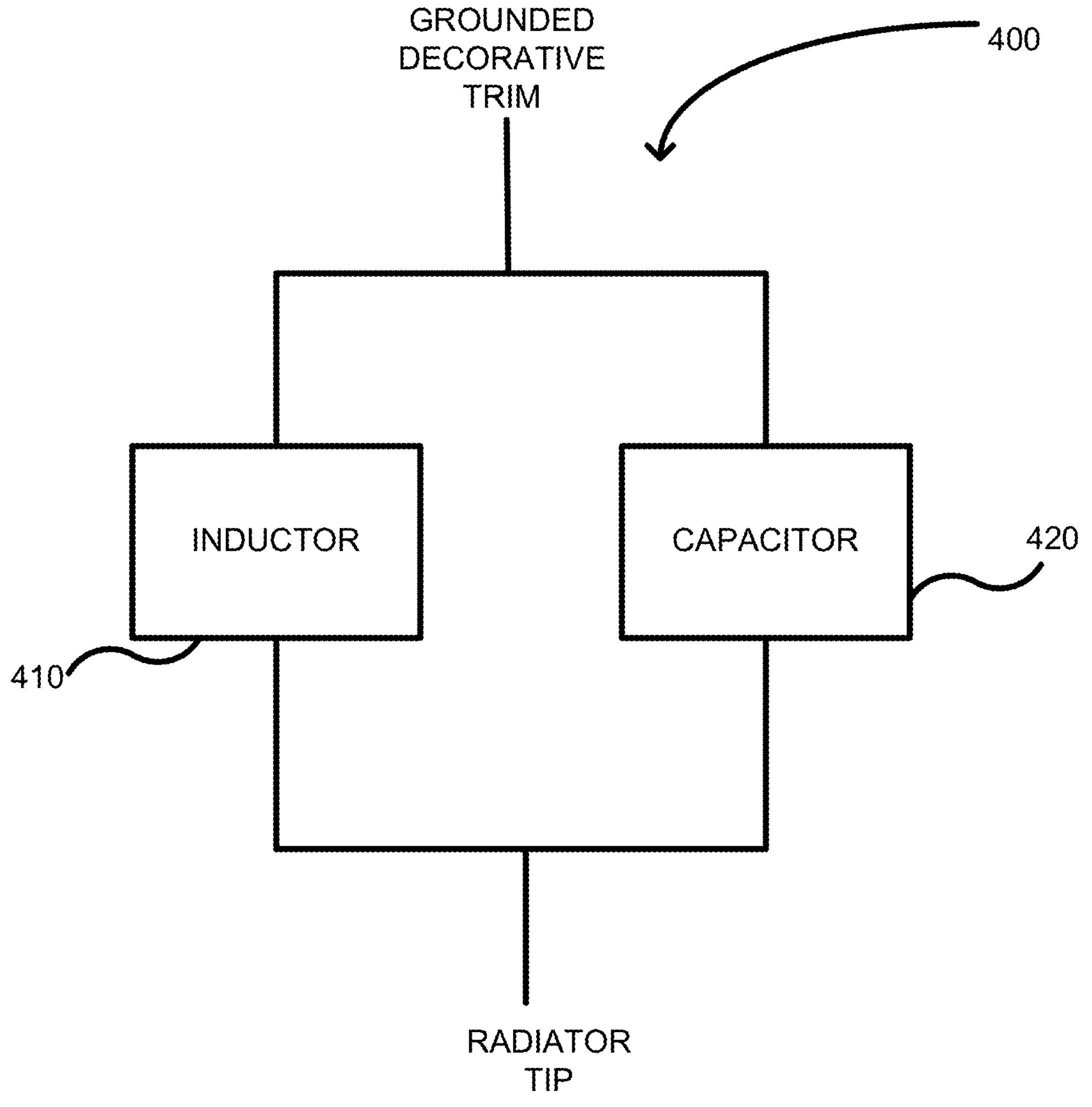
FIG. 4 is an embodiment of a circuit element that is a passive filter.

FIG. 4 shows an example of the circuit element 400 that can be used in the previous embodiments. In this embodiment, the circuit element is a passive filter including an inductor 410 and a capacitor 420 coupled in parallel between a radiator tip and a grounded decorative trim. Other capacitive/inductive/resistive circuits can be used, as is well-understood in the art.

Figure 5:
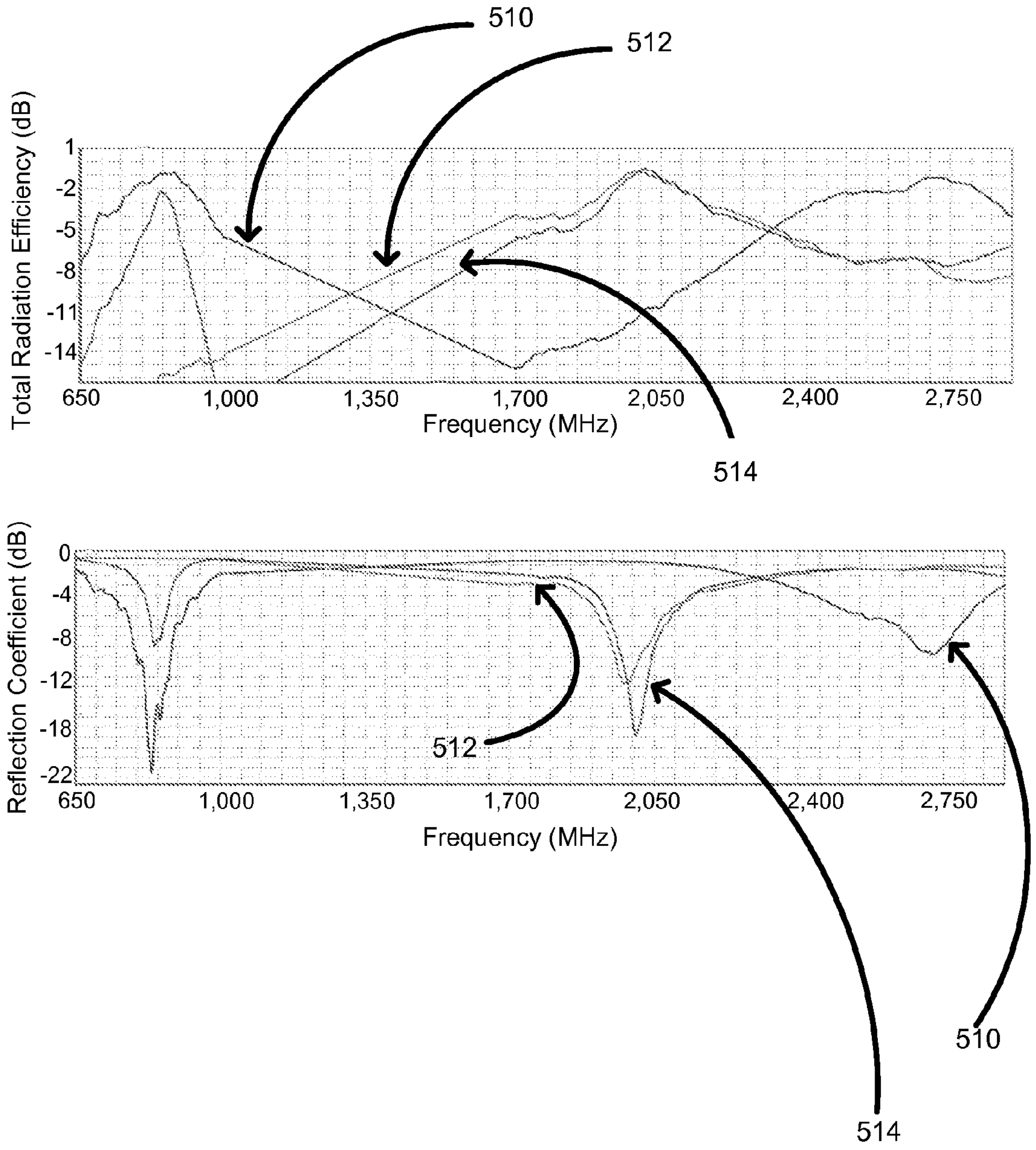
FIG. 5 includes graphs showing antenna efficiency versus frequency and a reflection coefficient of the antenna.

FIG. 5 is an example graph generated by using 27 nH inductance and 1.2 pF capacitance in the circuit of FIG. 4. The top graph shows the antenna efficiency (in dB) versus frequency. The bottom graph shows a reflection coefficient of the antenna (in dB), which is a measure of power reflected by the antenna. Ideal values have a high efficiency of greater than 3 dB and low reflection coefficients of less than 6 dB. Line 510 has a physical and electrical configuration of an open rim. A line 512 has the physical and electrical configuration of a closed rim. And line 514 has the physical configuration of an open rim and with the electrical configuration of an open rim at low frequencies and a closed rim at high frequencies.

Figure 6:
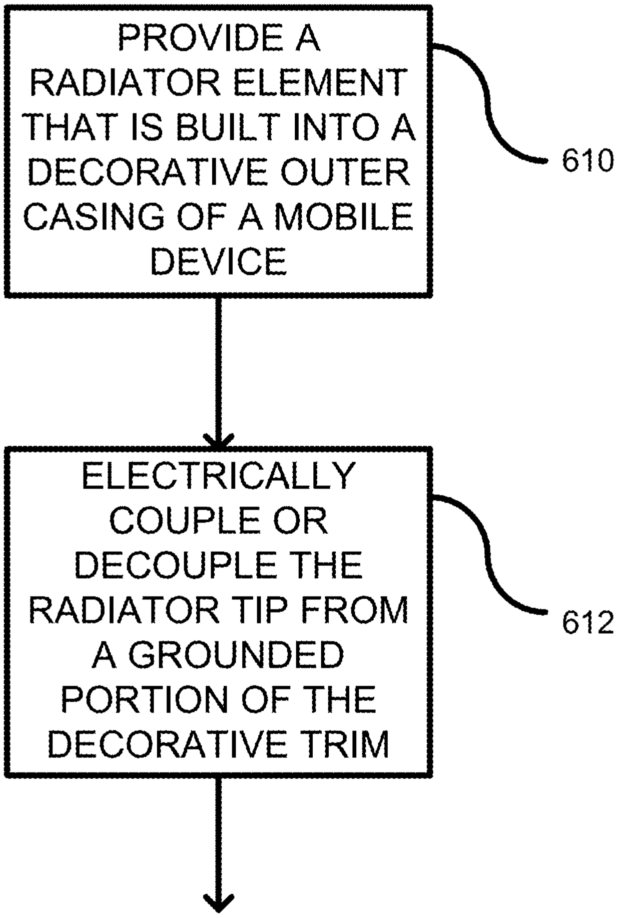
FIG. 6 is a flowchart of a method for operating a monopole antenna.

FIG. 6 is a flowchart of a method for operating a multiband monopole antenna. In process block 610, a radiator element can be provided that is built into a decorative outer casing, such as a rim around the perimeter of the mobile device. In process block 612, a radiator tip can be coupled or decoupled from a grounded portion of the decorative trim. In order to electrically couple or decouple the radiator tip, a modem can control a circuit element to selectively open or close a switch. Alternatively, the modem can selective tune a tunable filter circuit element in order to dynamically change an impedance. Still further, a proximity sensor can selectively detect a proximity of a user's head to the mobile device and dynamically change the impedance based on the proximity thereto. Still further, a circuit element can be used to detect an impedance by detecting an incident and reflected power. Based on the detected impedance, the impedance can be changed through a tunable circuit element inserted into the radiator element.

Any of the disclosed methods can have aspects that are implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A multiband monopole antenna for a mobile device, comprising:

a radiator element that is at least a first part of a decorative trim on an outer casing of the mobile device, the radiator element having a first end coupled to a feed point and a second end which is a tip of the radiator element; and a first circuit element positioned between the radiator element and the decorative trim to effectively electrically connect or disconnect the radiator tip from a second part of the decorative trim used as ground;

the first circuit element being a switch having a control line coupled to a modem for selectively opening and closing the switch so as to electrically connect or disconnect the first part of the decorative trim and the second part of the decorative trim;

a second circuit element coupled adjacent to or at the feed point to the radiator element;

a proximity sensor coupled to the modem for detecting proximity to a user; and the modem configured to be responsive to the proximity sensor for controlling the second circuit element to adjust the impedance of the multiband monopole antenna.

2. The multiband monopole antenna of claim 1, further including an impedance matching portion of the decorative trim having a first end coupled to the feed point and a second end coupled to device ground.

3. The multiband monopole antenna of claim 2, wherein the second circuit element is coupled to the impedance matching portion of the decorative trim.

4. The multiband monopole antenna of claim 1, wherein the switch is a multi-pole, multi-throw switch.

5. The multiband monopole antenna of claim 1, wherein the feed point is coupled to the radiator element on a first side of the mobile device, and the circuit element is positioned on a second side of the mobile device, different than the first side.

6. The multiband monopole antenna of claim 1, wherein, based on the state of the circuit element, the multiband monopole antenna is switchable between a quarter wavelength and a half wavelength antenna.

7. The multiband monopole antenna of claim 1, wherein the second circuit element is a tunable element including at least a capacitor or an inductor.

8. The multiband monopole antenna of claim 1, further including a third circuit element coupled to the modem for detecting an impedance through measuring incident and reflected power.

9. A method of operating a multiband monopole antenna, comprising:

providing a radiator element that is built into at least a first part of a decorative trim on an outer casing of the mobile device, the decorative trim being conductive and extending around an outer perimeter of the mobile device to form a conductive loop, the radiator element coupled to a feed point at one end and a radiator tip at an opposite end;

electrically grounding a second part of the decorated trim;

electrically coupling or decoupling the first part of the decorative trim at the radiator tip and the grounded second part of the decorative trim using a first circuit element positioned between the radiator tip and the decorative trim;

wherein the first circuit element is a switch having a control line coupled to a modem, and the method includes selectively opening or closing the switch so as to create an opening in the conductive loop when the switch is open and for electrically closing the conductive loop when the switch is closed; and dynamically changing impedance within the multiband monopole antenna by tuning a second circuit element coupled to the decorative trim in response to a proximity sensor.

10. The method of claim 9, wherein the switch is a multi-pole, multi-throw switch.

11. The method of claim 9, wherein the feed point is coupled to the radiator element on a first side of the mobile device, and the first circuit element is positioned on a second side of the mobile device, different than the first side.

12. The multiband monopole antenna of claim 9, wherein the second circuit element is positioned at or adjacent to the feed point.

13. The multiband monopole antenna of claim 12, wherein the feed point is coupled to the radiator element on a first side of the mobile device, and the first circuit element is positioned on a second side of the mobile device, different than the first side.

14. The multiband monopole antenna of claim 9, wherein, based on the state of the first circuit element, the multiband monopole antenna is switchable between a quarter wavelength and a half wavelength antenna.

15. The multiband monopole antenna of claim 9, further including a third circuit element coupled to the modem for detecting an impedance through measuring incident and reflected power and the modem tunes the first circuit element in order to have impedance matching.

16. The multiband monopole antenna of claim 9, wherein the first circuit element is a tunable element including a capacitor and/or an inductor, and further including tuning the first circuit element so that it has a matching impedance.

17. A mobile phone including a multiband monopole antenna, comprising:

a metallic rim extending around a perimeter of the mobile phone, wherein a first portion of the metallic rim is coupled to ground and a second portion of the metallic rim is a radiator element for an antenna of the mobile phone;

a feed point coupled to the metallic rim at a point along the second portion thereof;

a first circuit element coupled between an end of the radiator element and the first portion of the metallic rim;

an impedance matching portion of the antenna coupled between the feed point and the first portion of the metallic rim;

wherein the first circuit element is a switch that can selectively connect and disconnect the end of the radiator element to the first portion of the metallic rim;

a proximity sensor positioned within the mobile phone;

a second circuit element coupled to the metallic rim at a point along the impedance matching portion of the antenna; and a modem, within the mobile phone, coupled to the proximity sensor and the second circuit element, the modem for controlling the second circuit element in response to the proximity sensor detecting a user so as to dynamically change impedance of the multiband monopole antenna in response to a user being proximate to the mobile phone.

18. The mobile phone of claim 17, wherein the second circuit element is a tunable element including a capacitor and/or an inductor.

19. The mobile phone of claim 17, further including detecting an impedance of the antenna by measuring incident and reflected power.

* * * * *